(No Model.)
W. LAMB & S. H. LAMB, Jr.
LOCK ATTACHMENT FOR BICYCLES.
No. 518,323. Patented Apr. 17, 1894.
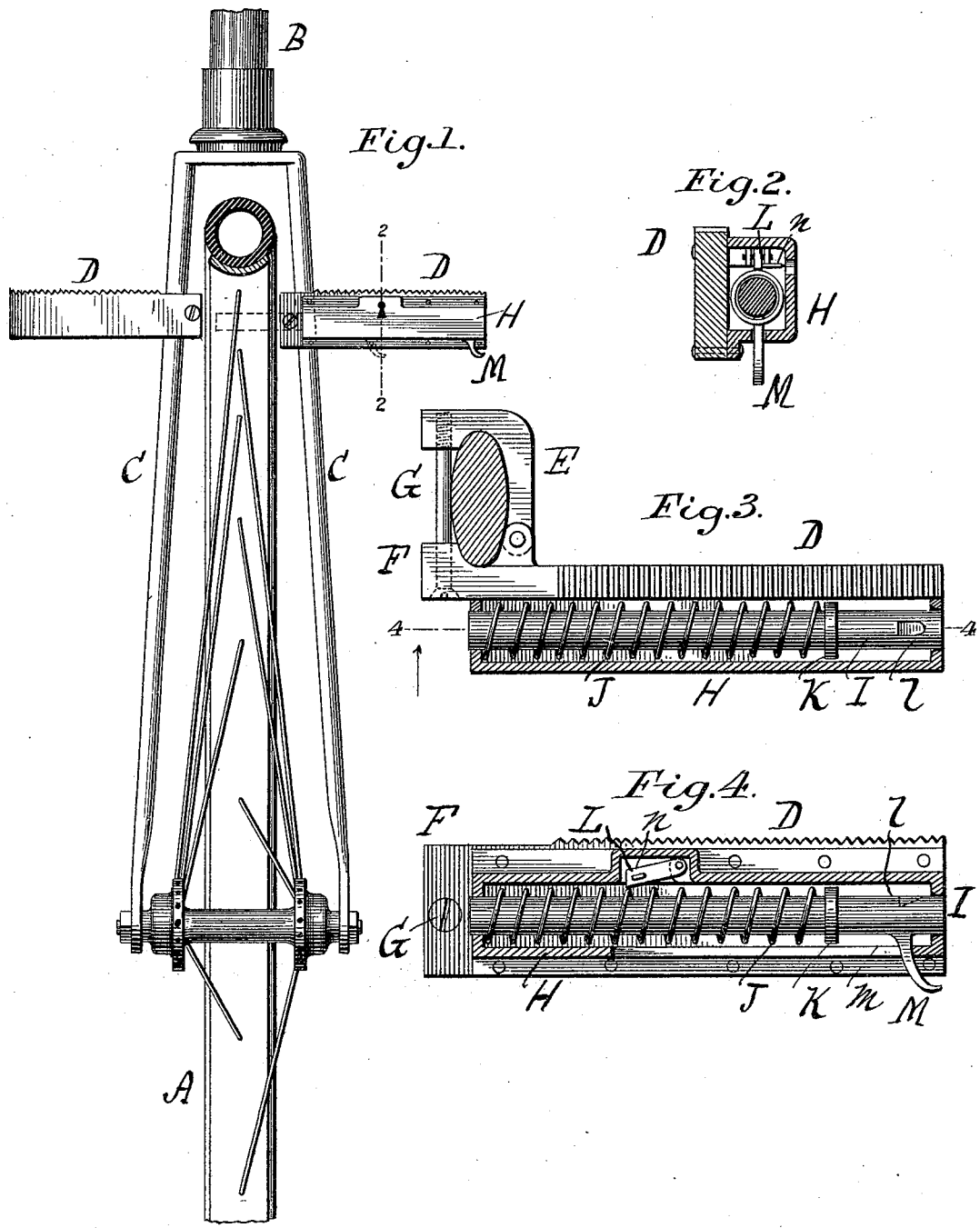
Witnesses:
J. M. Fowler
J. M. Emry
Inventors
Walter Lamb
Spence H. Lamb, Jr.
By Atty
THE NATIONAL LITHOGRAPHING COMPANY,
WASHINGTON, D. C.

UNITED STATES PATENT OFFICE.

WALTER LAMB AND SPENCE H. LAMB, JR., OF MEMPHIS, TENNESSEE.

LOCK ATTACHMENT FOR BICYCLES.

SPECIFICATION forming part of Letters Patent No. 518,323, dated April 17, 1894.

Application filed October 9, 1893. Serial No. 487,587. (No model.)

*To all whom it may concern:*

Be it known that we, WALTER LAMB and SPENCE H. LAMB, Jr., citizens of the United States, residing at Memphis, in the county of Shelby and State of Tennessee, have invented certain new and useful Improvements in Lock Attachments for Bicycles; and we do hereby declare the following to be a full, clear, and exact description of the invention, such as will enable others skilled in the art to which it appertains to make and use the same.

This invention relates to certain improvements, as hereinafter claimed, in that class of lock-attachments for bicycles which are secured to the bicycles and serve to lock the front or steering wheels thereof against rotation to prevent unauthorized use or theft of the machines.

In the accompanying drawings, Figure 1 is a front elevation, partly in section, of a portion of a bicycle with the improved lock-attachment. Figs. 2, 3 and 4 are views on a larger scale than Fig. 1, showing details of construction; Fig. 2 being a view partly in elevation, and partly in section on the line 2 of Fig. 1; Fig. 3 a view partly in plan, and partly in section at a right angle with Fig. 2, and Fig. 4 a view partly in elevation, and partly in section on the line 4 of Fig. 3.

The front or steering wheel A, the steering post B, and its forks C C are of suitable well known construction. Coasting foot rests D D are applied one to each fork of the steering post to support the feet of the rider of the machine in descending grades, as is well understood. One (or, if desired, both) of these rests is provided with a locking attachment in accordance with the improvements hereinafter claimed and as next to be explained.

One foot rest D (or it may be both) is connected with the steering post fork so as to be detachable. As shown the foot rest is attached to the post fork by means of a jointed clamp, the movable part or jaw E of which is pivotally connected with the fixed part or jaw F, while a clamping screw G serves to draw together the jaws tightly about the steering post fork and securely hold the foot rest in place.

A case H of suitable lock mechanism is securely attached to the front of the foot rest in any appropriate way, preferably by rivets, as shown. The lock mechanism selected for illustrating a suitable way of carrying out this invention is of very simple construction. The bolt I thereof is adapted to be moved so as to be projected between spokes of the wheel (see dotted lines Fig. 1) and to be locked against withdrawal so as to prevent rotation of the wheel.

The details of the lock mechanism shown are as follows:—The sliding lock-bolt I is housed within the case H, and a coiled spring J, bearing at one end against the end of the case and at its opposite end against a collar on the bolt, acts with a tendency to hold the bolt in its retracted or inoperative position, and to restore it to such position when released from the dogging device by which it is held in its locked position. A key-operated locking arm or dog L pivoted in the lock case is adapted to engage a shoulder *l* of the bolt near its outer end. A finger piece M of the bolt projects through a slot *m* in the bottom of the lock case and serves as a means for moving the bolt against the force of its spring until the dog L drops into engagement with the shoulder *l* of the bolt, at which time the bolt is in position to project between adjacent spokes of the wheel. To unlock the bolt and permit of its retraction a key is employed which is adapted to engage a lug *n* on the locking dog and lift the dog out of engagement with the bolt thus leaving the spring J free to act to instantly retract the bolt.

If desired a spring may be employed to act by downward pressure upon the locking dog to cause its engagement with the lock bolt instead of depending upon the action of gravity alone for this engagement.

To prevent access of dirt, &c., by way of the key hole to the lock case an ordinary pivoted key hole guard may be applied to the case so as to cover the key hole when the key is not in it.

From the above description it will be seen that suitable provision is made for applying any appropriate lock mechanism to the coasting foot rests of bicycles of various construction; that the lock is out of the way and protected from injury; and that when the lock bolt is projected it covers the head of the foot-rest attaching screw so as to render access to the screw and the removal of the foot rest impossible.

As the leading feature of this invention relates to the application to the coasting foot rest of a bicycle of locking mechanism comprising a bolt adapted to be moved into position to project between spokes of the steering wheel of the machine, and to be locked in such position, it is to be understood that the invention claimed is not to be considered as confined to the details of the particular lock mechanism above specifically described, nor to any particular way of connecting the foot rest with the steering post fork, nor to peculiarities in construction of the foot rest or in the application thereto of the locking mechanism in manner as in detail described.

We claim as our invention—

1. In a bicycle, the combination with the coasting foot rest, of lock mechanism applied to said foot rest and provided with the bolt adapted to be moved into position to project between spokes of the steering wheel, substantially as set forth.

2. The bicycle coasting foot rest adapted for attachment to a fork of the steering post and provided with the lock case, the lock bolt adapted to be moved into position to project between spokes of the wheel, means for dogging and releasing the lock bolt, and the spring for retracting the bolt, substantially as set forth.

In testimony whereof we affix our signatures in presence of two witnesses.

WALTER LAMB.
SPENCE H. LAMB, Jr.

Witnesses:
E. L. RICE,
LEW PRICE.